United States Patent
Hashimoto

(10) Patent No.: US 6,842,651 B1
(45) Date of Patent: Jan. 11, 2005

(54) PROGRAMMABLE CONTROLLER HAVING PLURAL SPEED PATTERN GENERATORS

(75) Inventor: Youichi Hashimoto, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/926,446

(22) PCT Filed: Apr. 24, 2000

(86) PCT No.: PCT/JP00/02691
§ 371 (c)(1),
(2), (4) Date: Jan. 28, 2002

(87) PCT Pub. No.: WO00/68745
PCT Pub. Date: Nov. 16, 2000

(30) Foreign Application Priority Data

May 6, 1999 (JP) ............................. 11-126059

(51) Int. Cl.$^7$ ............................................. G05B 11/01
(52) U.S. Cl. ............................... 700/18; 700/46; 700/63; 700/69; 700/170; 700/181; 318/561; 318/567; 318/568.13; 318/568.18
(58) Field of Search ............................... 700/18, 86–89, 700/181, 25 C, 63–69, 70, 46; 318/560–561, 567, 568.1, 568.13, 568.18, 568.23; 72/421, 429

(56) References Cited

U.S. PATENT DOCUMENTS

| | | | | |
|---|---|---|---|---|
| 4,155,426 A | * | 5/1979 | Booker, Jr. ................. 187/295 |
| 4,348,731 A | * | 9/1982 | Kogawa ...................... 700/245 |
| 4,408,868 A | * | 10/1983 | Thomas et al. ............... 355/77 |
| 4,698,509 A | * | 10/1987 | Wells et al. .............. 250/492.2 |
| 4,767,910 A | * | 8/1988 | Stevens et al. .......... 219/125.1 |
| 5,380,181 A | * | 1/1995 | Hiraoka et al. ............. 425/145 |
| 5,394,743 A | * | 3/1995 | Noguchi et al. .............. 73/117 |
| 5,396,792 A | * | 3/1995 | Kohsaka et al. .............. 73/117 |
| 6,781,339 B1 | * | 8/2004 | Ikeguchi ..................... 318/569 |

FOREIGN PATENT DOCUMENTS

| JP | 57037267 A | * | 3/1982 | ........... G01P/3/481 |
|---|---|---|---|---|
| JP | 57050023 A | * | 3/1982 | ............ G05D/3/20 |
| JP | 07-064620 | | 3/1995 | |
| JP | 10-039913 | | 2/1998 | |
| JP | 10-039915 | | 2/1998 | |

* cited by examiner

Primary Examiner—Ramesh Patel
(74) Attorney, Agent, or Firm—Westerman, Hattori, Daniels & Adrian, LLP

(57) ABSTRACT

A programmable controller comprises a speed pattern generator(12) including speed pattern generator units (12a–12n) that respond to input quantities of the amount of movement, speed, acceleration time and deceleration time by calculating a desired speed pattern for output to a servomotor (17). A desired speed pattern is generated by simultaneously operating any of the speed pattern generator units (12a–12n) of the speed pattern generator (12). The speed pattern provided by the speed pattern generator (12) is output to a console (14), on which the user can process the speed pattern freely.

7 Claims, 3 Drawing Sheets

PROGRAMMABLE CONTROLLER HAVING PLURAL SPEED PATTERN GENERATORS

TECHNICAL FIELD

The present invention relates to a programmable controller which generates a speed command to a servomotor.

BACKGROUND ART

Priorly, when generating a speed pattern by a programmable controller, as shown in the block diagram of a controller of FIG. 4, in a speed pattern generator portion 42 which automatically generates an acceleration and deceleration pattern (such as a trapezoidal wave pattern, an asymmetric pattern and the like) based on a move command 41 (processing program) giving the amount of movement, speed, acceleration time, and deceleration time, for example, a trapezoidal wave acceleration and deceleration pattern is generated, a speed command 43 including the acceleration time, specified speed, deceleration time, amount of movement represented by the area of the trapezoid, as shown in FIG. 5, is output and provided for a servo control portion 44, and a servomotor 45 is controlled by the speed command.

Also, in a case of synchronous control between two spindles (the number of main and slave spindles is not specified) having the master-servant relationship where the slave spindle is driven in synchronization with movement of the main spindle as shown in FIG. 6, similar to the case of the speed command for one spindle (asynchronous control) as shown in FIG. 5, a speed command, which is provided for the main spindle and slave spindle, respectively, while maintaining the synchronous relationship, is automatically generated in accordance with a command from the superordinate.

However, in the above-described prior art, according to the speed pattern generating function, the move command (or a processing program) is analyzed, thereupon the speed pattern is automatically generated, therefore generation of the speed pattern has been fixed to synchronous/asynchronous timing specified by the move command and it has been impossible for a user to carry out a start/stop at free timing.

In addition, when the speed pattern is generated by the speed pattern generating function, the calculation results are directly output to the servomotor, therefore, it has been impossible to process said speed pattern halfway and output these to the servomotor as a speed command.

Accordingly, there has been a problem such that, due to the above-described drawbacks, speed patterns other than the speed pattern provided by the controller cannot be realized.

Therefore, it is an object of the present invention to provide a speed pattern generator as one function and open the calculation results to the user without outputting the results as a command to a servomotor, whereby providing a programmable controller which is capable of providing an environment which allows the user to realize an arbitrary speed pattern.

DISCLOSURE OF INVESTIGATION

In order to achieve the above-described object, according to the first aspect of the invention, a programmable controller which comprises a speed pattern generator including speed pattern generator units that receive input of the amount of movement, speed, acceleration time, and deceleration time and calculate a desired speed pattern for output to a servomotor, wherein the speed pattern generator includes a plurality of speed pattern generator units and also generates a desired speed pattern by simultaneously operating one or more arbitrary speed pattern generator units of said plurality of speed pattern generator units.

Also, according to the second aspect of the invention, the programmable controller comprises a user operation portion, the speed pattern generator outputs the calculated speed pattern to said user operation portion, and an output is sent from said user operation portion to the servomotor. Moreover, according to the third aspect of the invention, the user operation portion can be started and stopped by a user at free timing.

Furthermore, according to the fourth aspect of the invention, the speed pattern generator units store trapezoidal waveforms having arbitrary shapes and a desired speed pattern is generated as a composite pattern that is geometrically superposed based on the algebraic sum of these trapezoidal waveforms.

BEST MODE FOR CARRYING OUT THE INVENTION

Hereinafter, an embodiment of the present invention will be described with reference to the drawings.

Figure 1:
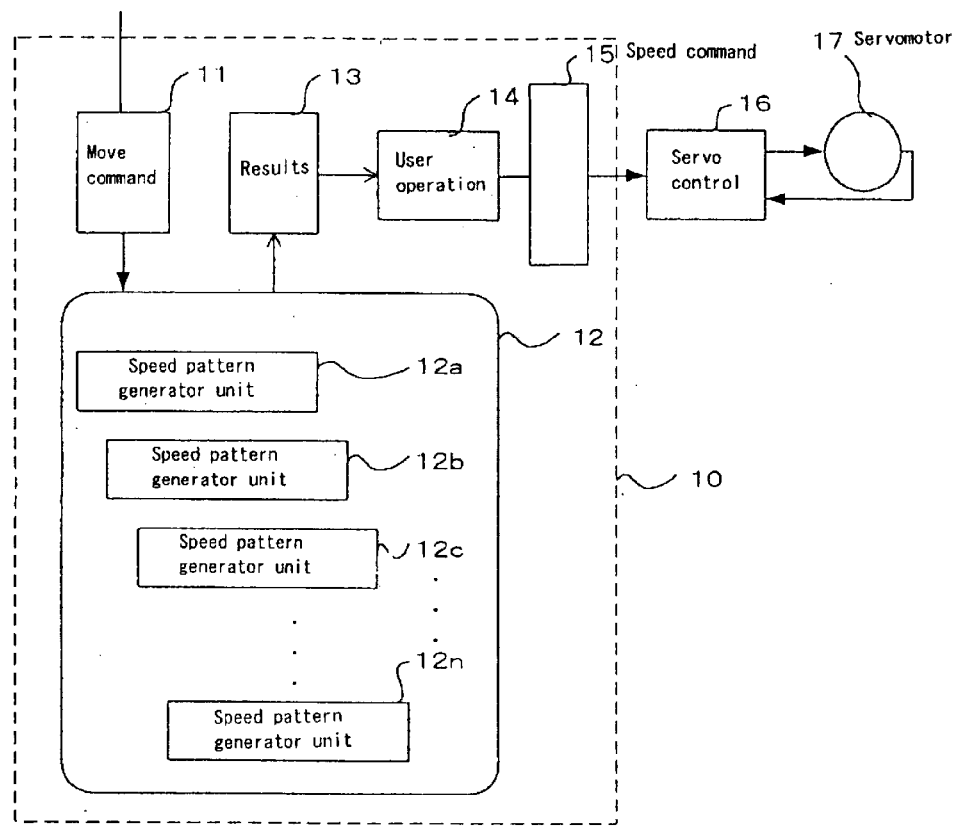
FIG. 1 is a block diagram of the program executing processing by the program controller according to an embodiment of the present invention.

Referring to FIG. 1, 10 denotes a programmable controller according to the present invention, 11 denotes a move command portion 14 for inputting a move command into a speed pattern generator 12 by a user, and 12 denotes the speed pattern generator which includes various speed pattern generator units 12a, 12b, 12c, . . . , 12n and outputs calculation results (a speed, a residual distance, and a delivery distance including a current amount of movement) to a results portion. 13 denotes the results portion for storing said calculation results. 14 denotes a user operation portion provided by the present invention and by superposing trapezoidal patterns of the various speed pattern generator units 12a, 12b, 12c, . . . , 12n inside the speed pattern generator 12 on each other by use of the results of the results portion 13, a desirable speed pattern can be easily generated. 15 denotes a speed command portion which receives an output from the user operation portion 14 and generates a speed command to be given to a servomotor. 16 denotes a servo control portion and 17 denotes a servomotor. In the program executing processing by the programmable controller shown in FIG. 1, when a user inputs the move command 11 into the speed pattern generator 12, the speed pattern generator 12 calculates a speed pattern according to said move command and outputs the speed pattern to the results portion 13.

The user freely processes the calculation results of the results portion 13 from the speed pattern generator 12 by means of the user operation portion 14 and outputs a desirable speed command for the servomotor 17 to the speed command 15 and provides this command for the servo control portion 16.

In this case, a plurality of speed pattern generator units 12a, . . . , 12n exist and can start/stop at a user's desirable timing.

Figure 2:
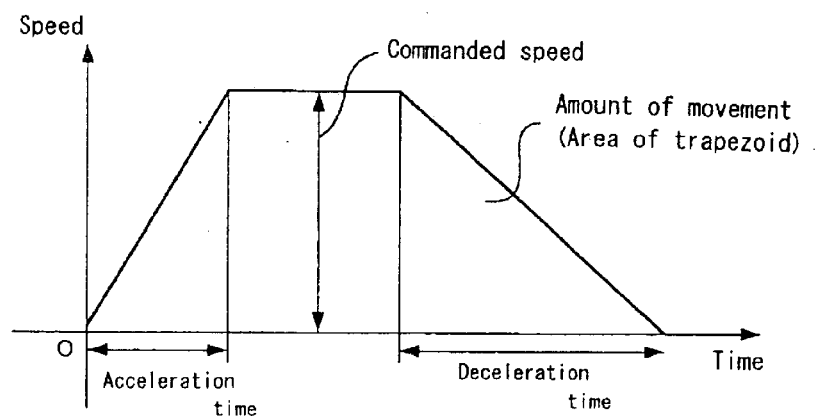
FIG. 2 is a diagram showing an output example of the speed pattern generator unit shown in FIG. 1.

In the output example of the speed pattern generator shown in FIG. 2, the speed, acceleration time, and deceleration time are at values specified by the user and the area of the trapezoid ABCD represents an amount of movement specified by the user.

Now, operations will be described.

In a case where the user moves the servomotor 17 by a certain amount of movement, the velocity waveform of the servomotor 17 becomes a polygon based on the trapezoid as shown in FIG. 2. When the area of this polygon is regarded as the amount of movement, a combination of trapezoids which realizes this area and polygonal shape by adding or deducting trapezoids having arbitrary shapes is determined.

Based on the combination of trapezoids thus determined, the user inputs, while weighing the timing for realizing this polygon, the move command 11 into a plurality of speed pattern generator units 12a through 12n and obtains calculation results from each thereof. The algebraic sum of results 13 (trapezoids) from said plurality of speed pattern generator units 12a through 12n is output to the servo control portion 16 as a timely speed command 15, whereby a desirable velocity waveform can be realized.

For inputting the move command 11, a formula where a processing program is given to a controller by a CPU module is employed, whereas in the present case, it becomes possible to directly input into the speed pattern generator 12 of the controller by the user as the move command 11.

In addition, in the user operation portion 14, it is possible to perform processing (various filtering operations) to the algebraic sum waveform of values (trapezoids) of the results portion 13, which are calculation results from the speed pattern generator 12. The user operation portion 14 is constructed such that the user can perform processing such as superposition and the like by use of a mouse and the like in a dialogue manner while monitoring a polygonal waveform of the calculated results which is displayed on a display device (unillustrated).

Concretely, referring to the speed command example of FIG. 3, a case will be described, wherein a velocity waveform having a polygonal shape ABEGJIHFCD is realized.

Figure 3:
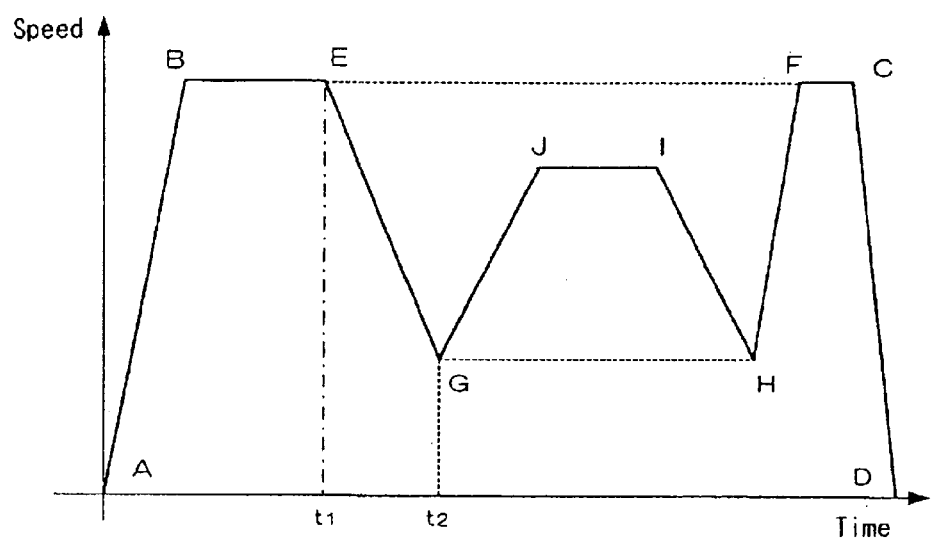
FIG. 3 is a diagram showing the speed command of the controller shown in FIG. 1.
Figure 4:
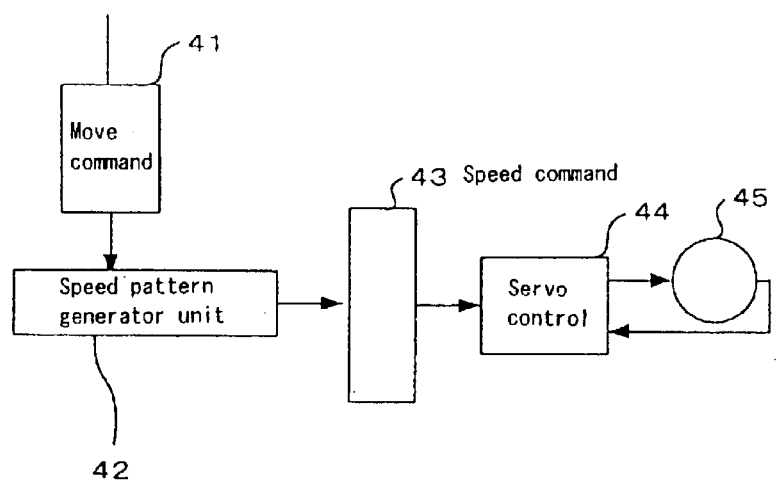
FIG. 4 is a block diagram of the prior programmable controller.
Figure 5:
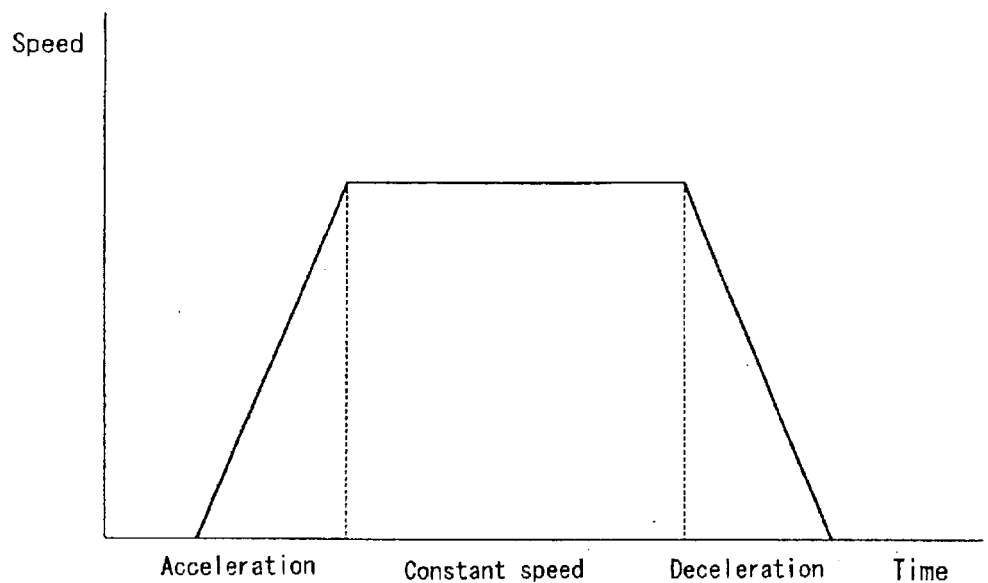
FIG. 5 is a diagram showing an output example of the prior speed command.
Figure 6:
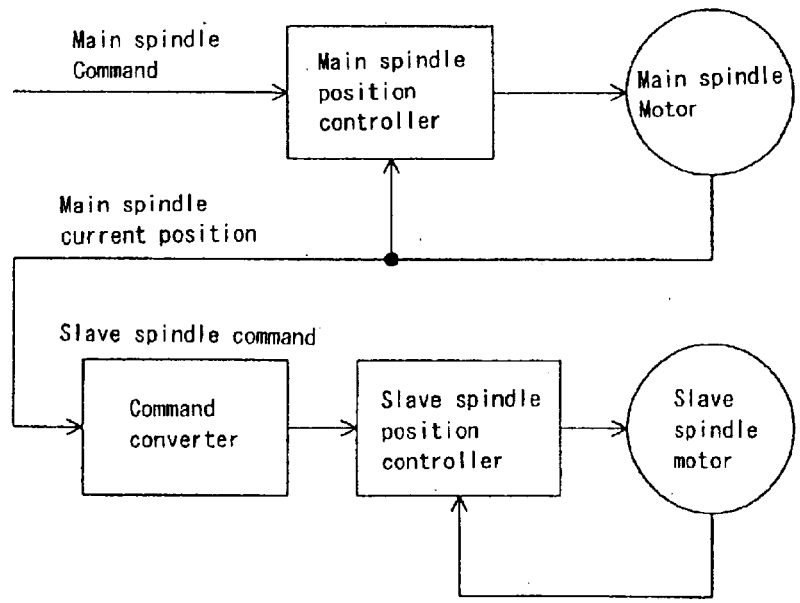
FIG. 6 is an explanatory diagram of the prior simultaneous control.

(1) First, as shown in FIG. 3, generation of a speed pattern ABCD, which is the same as the trapezoid shown in FIG. 2, is carried out and this pattern is set as an output 1.

(2) Then, generation of a speed pattern of a trapezoid EGHF is carried out at a time t1, and since this output is in the decelerating direction, this output is deducted from the output 1 and the resulting pattern is set as an output 2.

(3) Generation of a speed pattern of a trapezoid GHIJ is carried out at a time t2, and since this output is in the acceleration direction, this output is added to the output 2 and the resulting pattern is set as an output 3.

By setting such outputs 1 through 3 as a speed command to the servo control portion 16, it becomes possible to command the velocity waveform having the shape ABEGJIHFCD illustrated by the solid lines, thus making it possible to freely execute the speed command by user operations.

Such free execution of the speed command by user operations is possible irrespective of synchronous/asynchronous control. As a simple example of synchronous control, in a case where for a main spindle which carries out one cutting process with acceleration, constant speed, and deceleration as shown in the trapezoid ABCD of FIG. 2, synchronous control such that a slave spindle which is synchronous therewith causes movement with a speed demand of the trapezoid ABCD which has been inverted without a change toward the minus region (toward the side under the O-line of FIG. 2) is carried out, if the user rewrites the speed command of the main spindle, as the output 3 shown in FIG. 3, so as, for example, to cause the tool end to approximate to the workpiece for the acceleration time AB, carry out two cutting processes composed of two stages with acceleration and deceleration for EGJIHF, and return to the origin for deceleration time CD, the speed command of the slave spindle is also rewritten to an inverted trapezoid based on the speed command ABEGJIHFCD of the main spindle. (Furthermore, it is also possible to separately rewrite the trapezoidal speed commands of the main spindle and the slave spindle and/or to shift the timing, as the case may be.)

Thus, it becomes possible for the programmable controller (or a motion controller) to carry out generation of and rewriting of a speed command independent of a command from a superordinate device such as a CPU module and the like, and it also becomes possible to carry out correction of acceleration in a case of motion program look-ahead predictive control for a plurality of blocks without waiting for program modifications by the superordinate device, therefore this controller effectively functions as a distributed system, whereby enabling an improvement in cycle time to improve the productivity.

As has been described above, according to the present invention, the user freely processes an output from the speed pattern generator provided by the programmable controller (or a motion controller), whereby it becomes possible to output an arbitrary speed command to the servomotor, therefore the user has an effect to improve the tact time of a machine.

Furthermore, the speed pattern generator of the present invention is similar to a shift order such as automatic acceleration and deceleration in the motion program in terms of the commanding method, therefore there is also an effect such that consistency in use is excellent and a decline in production costs can be expected.

INDUSTRIAL APPLICABILITY

The present invention can provide a programmable controller where generation and processing of speed command patterns by user operation is possible, therefore it is optimal for use where complicated machine control is carried out.

What is claimed is:

1. A programmable controller comprising a speed pattern generator including a plurality of speed pattern generator units that respectively receive input of an amount of movement, speed, acceleration time and deceleration time and calculate a desired speed pattern for output to a servomotor, wherein said speed pattern generator generates a desired speed pattern by operating a speed generator unit of said plurality of speed pattern generator units.

2. A programmable controller as set forth in claim 1, wherein the programmable controller comprises a user operation portion, the speed pattern generator outputs the calculated speed pattern to said user operation portion, and an output is sent from said user operation portion to the servomotor.

3. A programmable controller as set forth in claim 2, wherein the user operation portion can be started and stopped by a user.

4. A programmable controller as set forth in claim 2, wherein the user operation portion allows a user to monitor a waveform representing the calculated speed pattern.

5. A programmable controller as set forth in claim 1, wherein the speed pattern generator units store trapezoidal waveforms having arbitrary shapes and a desired speed pattern is generated as a composite pattern that is geometrically superposed based on the algebraic sum of these trapezoidal waveforms.

6. A programmable controller as set forth in claim 1, wherein the desired speed pattern is generated by simultaneously operating plural speed pattern generator units of said plurality of speed pattern generator units.

7. A programmable controller as set forth in claim 1, wherein the plurality of speed pattern generator units respectively generate arbitrary speed patterns.

* * * * *